March 15, 1949.　　　　F. M. YOUNG　　　　2,464,541
METAL REINFORCEMENT AND METHOD OF FORMING SAME
Filed April 23, 1945
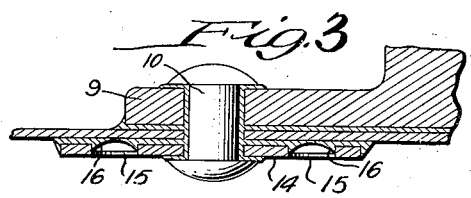
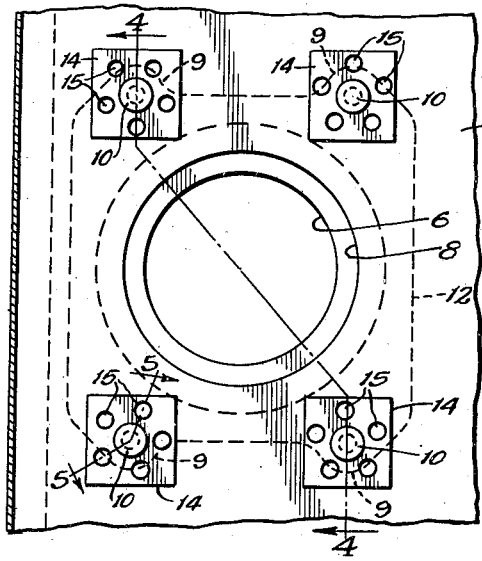 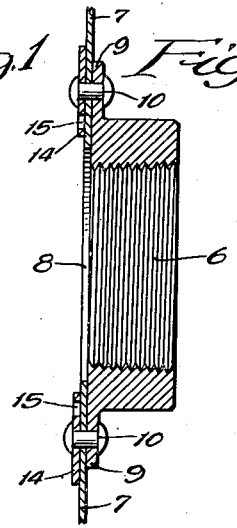
Inventor:
Fred M. Young,
By Soans, Pond Henderson
Attorneys.

Patented Mar. 15, 1949

2,464,541

UNITED STATES PATENT OFFICE 2,464,541

METAL REINFORCEMENT AND METHOD OF FORMING SAME

Fred M. Young, Racine, Wis., assignor to Young Radiator Company, Racine, Wis., a corporation of Wisconsin Application April 23, 1945, Serial No. 589,789

2 Claims. (Cl. 285—49)

In the formation of receptacles from comparatively thin sheet metal, one of the problems encountered is the reinforcement of the housing at the point where fittings have to be attached. In the past the practice has involved the use of a strip of sheet metal secured on the side of the supporting material opposite that on which the fitting was attached. Such a strip is secured in place by the use of rivets extending through suitable holes in a flange, on the fitting in the sheet metal, and in the reinforcing strip. Subsequently solder has been applied, first around the entire perimeter of the fitting flange and later along the perimeter of the reinforcing strip. This past means and method of reinforcement has two disadvantages. It involves the use of an excessive amount of metal for the reinforcing strip, and has required an excessive amount of labor in effecting the soldering.

The main objects of this invention, therefore, are to provide an improved means and method of metal reinforcement particularly adapted for use with light sheet metal equipment; to provide an improved type of reinforcing means and method of applying which greatly reduces the requirement for metal and lessens the labor requirements for the soldering operation; and to provide an improved means and method of metal reinforcement which is exceedingly simple in practice and which provides a completed structure of great strength and durability.

In the drawings,

Figs. 1 and 2, show the reinforcements embodying the preferred form of this invention; and Fig. 3 is an enlarged fragmentary sectional detail taken on the line 3—3 of Fig. 1.

In sheet metal construction, particularly such as is used for heat transfer units, one or more fittings 6 have to be attached to the sheet metal element or housing 7 adjacent to an opening 8 to serve as an inlet and/or outlet. The fitting 6 usually has a flange 9, holes in which are suitably formed to register with similar holes in the sheet metal 7 and to receive mechanical bonds 10 in the form of rivets.

Because this flanged fitting 6 is usually of a rather heavy construction and the sheet metal 7 is rather light, it has been the practice to reinforce the sheet metal 7 at the point of attachment of the fitting 6. In the past this has been accomplished through the use of a thin strip of metal provided with holes to register with those in the flange 9 of the fitting 6 and in the sheet metal 7 and through which extend the mechanical bonds 10.

In order to make such connection fluid-tight, it has to solder the flange 9 to the sheet metal 7 around the entire perimeter of the flange. The soldering has usually been done after applying the usual acid to the perimeters of the flange 9 and the reinforcing strip. The capillarity of the solder relative to the abutting faces of these parts would cause the solder to be drawn in toward the mechanical bond 10 and down between the abutting surfaces of the reinforcing strip and the sheet metal 7. However, it was never possible to ascertain how effective or extensive was this capillary action of the solder between the reinforcing strip and the sheet metal 7. Therefore, to further ensure the sealing of the fitting 6 to the sheet metal 7, it heretofore has been necessary to make a further application of solder around the entire perimeter of the reinforcing strip.

The improved means and method of metal reinforcement, embodying the present invention, involves the use of small reinforcing pads or plates 14, one of which is secured in place by each of the mechanical bonds 10. Each pad 14 has a number of apertures 15 formed therein concentrically around the hole provided for the reception of the mechanical bond 10.

Following the setting of the mechanical bonds 10, soldering acid is applied to the perimeter 12 of the flange 9 of the fitting 6 and to the apertures in the pads 14. The subsequent application of solder around the perimeter 12 of the flange 9 of the fitting 6 results in the solder being drawn by capillary action in between the sheet metal 7 and the flange 9 toward the mechanical bond 10 and into the apertures 15 in the pads 14. This is most clearly shown in the enlarged cross-sectional view of Fig. 3, the solder film 16 being somewhat exaggerated for the purpose of illustrating the results of this means and method of metal reinforcement.

The apertures 15, in addition to facilitating the capillary action of the solder as applied to the perimeter 12 of the flange 9, permit an observation to be made, as clearly shown in Fig. 3, as to how thoroughly the solder film 16 has found its way between the reinforcing pads 14 and the sheet metal 7, particularly between a mechanical bond 10 and the concentrically arranged apertures 15 of the related pads 14.

This improved form and practice has advantages over the prior art form and practice. In the first place, a great deal of material is saved, yet the rigidity of the fitting 6 on the sheet metal 7 is quite equal to what is accomplished in the prior art form and practice. In the second place, a great deal of labor has been saved, as solder has to be applied only around the perimeter 12 of the flange 9.

Variations and modifications in the details of structure and arrangement of the parts may be resorted to within the spirit and coverage of the appended claims.

I claim:

1. A metal reinforcement of the class described comprising, an element having an opening formed therein, a flanged fitting, a plurality of separately-formed reinforcing pads, and mechanical bonds extending through and clamping together said flanged fitting and said pads on respectively opposite sides of said element concentrically of said opening, said pads each having a plurality of apertures formed therein adjacent to said mechanical bond so as to form and expose to view fillets of solder around the perimeters of said apertures resulting from the capillarity of molten solder applied to the perimeter of said flanged fitting.

2. The method of reinforcing a light sheet-metal housing having an opening therein which comprises, providing a flanged fitting with apertures in the flange adapted for attachment to said sheet-metal housing bordering said opening, forming a plurality of separate reinforcing pads each with a mechanical bond aperture surrounded by a plurality of other apertures, securing said fitting and several of said pads in place on respectively opposite sides of said housing bordering of said opening by the setting of mechanical bonds extending through the apertures in said fitting flange and the mechanical-bond apertures in each of said pads, and then applying molten solder to the perimeter of the flange of said fitting sufficient to permit the capillarity of said solder to draw it to and around the mechanical bond and between the abutting faces of said pads and said element and in the formation of fillets around the perimeter of and exposed to view through said apertures.

FRED M. YOUNG.

REFERENCES CITED

The following references are of record in the file of this patent:

UNITED STATES PATENTS

| Number | Name | Date |
| --- | --- | --- |
| Re. 8,762 | Bourne | June 17, 1879 |
| 368,611 | Pratt | Aug. 23, 1887 |
| 701,777 | Vauclain | June 3, 1902 |
| 774,041 | Coffin | Nov. 1, 1904 |
| 1,591,057 | Schwartz | July 6, 1926 |
| 1,894,675 | Dixon | Jan. 17, 1933 |
| 1,924,121 | Jasper | Aug. 29, 1933 |
| 1,933,915 | Lindquist | Nov. 7, 1933 |
| 2,083,440 | Fink | June 8, 1937 |
| 2,089,125 | Kronquest | Aug. 3, 1937 |
| 2,129,583 | Johansson | Sept. 6, 1938 |

Certificate of Correction

Patent No. 2,464,541.                                           March 15, 1949.

FRED M. YOUNG

It is hereby certified that error appears in the printed specification of the above numbered patent requiring correction as follows:

Column 2, line 2, after the word "has" insert *been the practice*;

and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*